(12) United States Patent
Jonsky et al.

(10) Patent No.: US 12,341,449 B2
(45) Date of Patent: Jun. 24, 2025

(54) METHOD FOR DETERMINING A ROTATIONAL ANGLE POSITION OF A ROTOR OF A MULTIPHASE ELECTRICAL MACHINE, AND FREQUENCY CONVERTER

(71) Applicant: Lenze SE, Aerzen (DE)

(72) Inventors: Torben Jonsky, Hannover (DE); Heiko Stichweh, Springe (DE)

(73) Assignee: Lenze SE, Aerzen (DE)

( * ) Notice: Subject to any disclaimer, the term of this patent is extended or adjusted under 35 U.S.C. 154(b) by 418 days.

(21) Appl. No.: 17/798,703

(22) PCT Filed: Feb. 11, 2021

(86) PCT No.: PCT/EP2021/053280
§ 371 (c)(1),
(2) Date: Mar. 20, 2023

(87) PCT Pub. No.: WO2021/160713
PCT Pub. Date: Aug. 19, 2021

(65) Prior Publication Data
US 2023/0253902 A1  Aug. 10, 2023

(30) Foreign Application Priority Data
Feb. 11, 2020 (DE) .............. 10 2020 201 710.7

(51) Int. Cl.
*H02P 21/24* (2016.01)
*H02P 6/185* (2016.01)
(Continued)

(52) U.S. Cl.
CPC .............. *H02P 21/22* (2016.02); *H02P 21/18* (2016.02); *H02P 27/08* (2013.01)

(58) Field of Classification Search
CPC .......... H02P 21/22; H02P 27/08; H02P 21/24; H02P 21/18; H02P 6/185; H02P 6/186
(Continued)

(56) References Cited

U.S. PATENT DOCUMENTS 6,498,452 B1    12/2002   Luukko
7,388,367 B2 *   6/2008   Stauder ................... H02P 6/185
                                                        310/68 B
(Continued)

FOREIGN PATENT DOCUMENTS

DE   10 2015 211 863 A1    12/2016
DE      102015217986 A1 *   3/2017
(Continued)

OTHER PUBLICATIONS

De Belie et al., "Seamless Integration of a Low-Speed Position Estimator for IPMSM in a Current-Controlled Voltage-Source Inverter", Sensorless Control for Electrical Drives (SLED), 2010 First Symposium on, ISEE, Piscataway, NJ, Jul. 9, 2010, pp. 50-55, ISBN: 978-1-4244-7035-8., XP031728020, (six (6) pages).
(Continued)

*Primary Examiner* — Gabriel Agared
(74) *Attorney, Agent, or Firm* — Crowell & Moring LLP

(57) ABSTRACT

A method for determining a rotational angle position of a rotor of a multiphase electrical machine, includes the steps of: generating phase voltages for the multiphase electrical machine by pulse width modulation in accordance with a drive voltage vector circulating in a stator-fixed coordinate system. During a determination time interval: a) generating a test voltage vector, vectorially adding the test voltage vector and the actual drive voltage vector to form a sum vector, outputting the sum vector, and measuring a resulting change of a current vector formed from phase currents; b) repeating step a) for a changed rotational angle position
(Continued)

and/or a changed value of the drive voltage vector and for a changed test voltage vector a number n of times so that a total of n+1 different test voltage vectors and sum vectors are generated and n+1 resulting changes of the current vector are measured; and c) estimating the rotational angle position of the rotor in accordance with the total of n+1 measured changes of the current vector.

10 Claims, 4 Drawing Sheets

(51) Int. Cl.
    *H02P 21/18*     (2016.01)
    *H02P 21/22*     (2016.01)
    *H02P 27/08*     (2006.01)

(58) Field of Classification Search
    USPC .................................................. 318/400.02
    See application file for complete search history.

(56) References Cited

U.S. PATENT DOCUMENTS

| | | | | |
|---|---|---|---|---|
| 2010/0207555 | A1* | 8/2010 | Ide | H02P 21/32 318/400.02 |
| 2011/0012544 | A1* | 1/2011 | Schulz | B60L 15/08 318/400.33 |
| 2011/0101900 | A1 | 5/2011 | Basic et al. | |
| 2014/0265953 | A1* | 9/2014 | Collier-Hallman | B62D 5/0481 318/400.02 |
| 2015/0268283 | A1* | 9/2015 | Mariethoz | H02P 6/183 702/66 |
| 2015/0349682 | A1* | 12/2015 | Dixon | H02P 27/08 318/400.2 |
| 2018/0198391 | A1 | 7/2018 | Stichweh et al. | |
| 2020/0350843 | A1 | 11/2020 | Hammel et al. | |

FOREIGN PATENT DOCUMENTS

| | | | |
|---|---|---|---|
| DE | 102016102635 A1 * | 8/2017 | |
| WO | WO 00/72437 A1 | 11/2000 | |
| WO | WO 2017/045810 A1 | 3/2017 | |
| WO | WO 2019/120617 A1 | 6/2019 | |

OTHER PUBLICATIONS

International Search Report (PCT/ISA/210) issued in PCT Application No. PCT/EP2021/053280 dated Apr. 22, 2021 with English translation (six (6) pages).

German-language Written Opinion (PCT/ISA/237) issued in PCT Application No. PCT/EP2021/053280 dated Apr. 22, 2021 (eight (8) pages).

German-language Office Action issued in German Application No. 10 2020 201 710.7 dated May 15, 2018 with partial English translation (six (6) pages).

* cited by examiner

METHOD FOR DETERMINING A ROTATIONAL ANGLE POSITION OF A ROTOR OF A MULTIPHASE ELECTRICAL MACHINE, AND FREQUENCY CONVERTER

BACKGROUND AND SUMMARY

The invention relates to a method for determining a rotational angle position of a rotor of a multi-phase electrical machine, and to a frequency converter.

A method for identifying the magnetic anisotropy of an electric rotary field machine is described in WO 2017/045810 A1. By this method, four test voltage vectors are generated, and are sequentially superimposed on a common or time-invariant vector mean value.

The object of the invention is the provision of a method for determining a rotational angle position of a rotor of a multi-phase electrical machine, which detects the rotational angle position as reliably as possible, and in a highly dynamic manner.

The method for determining a rotational angle position of a rotor of a multi-phase, particularly a three-phase electrical machine, particularly in the form of a three-phase synchronous motor, comprises the steps described hereinafter.

Conventionally, for example three phase voltages (voltages between phase terminals of the multi-phase electrical machine) for the multi-phase electrical machine are generated by means of pulse-width modulation, in accordance with a drive voltage vector or drive voltage space vector circulating in a stator-fixed $\alpha/\beta$ coordinate system. In this regard, reference may be made to the relevant specialized literature. Pulse-width modulation can be executed, for example, by the appropriate actuation of a conventional H6 inverter.

During a determination time interval which comprises, for example, the duration of two PWM cycles, the following steps are executed.

Firstly, in step a) of the method according to the invention, a test voltage vector is generated in the stator-fixed $\alpha/\beta$ coordinate system, the test voltage vector and the instantaneous drive voltage vector are vectorially added to form a sum vector, and the resulting sum vector is delivered as an output, for example by a corresponding pulse-width modulation of/in the H6 bridge of the inverter. A resulting variation in a current vector formed from phase currents (currents flowing in the phase terminals of the multi-phase electrical machine) is measured.

In step b), step a) is repeated with a changed rotational angle position and/or a changed value of the drive voltage vector and, with a changed test voltage vector, a number n of times, such that a total of n+1 different test voltage vectors and corresponding sum vectors are generated, and n+1 resulting changes of the current vector are measured.

In step c), the rotational angle position of the rotor is estimated in accordance with the total of n+1 measured changes of the current vector.

Unlike the method described in WO 2017/045810 A1, according to the invention, the test vectors are not superimposed on any common or constant vector mean value. Instead, both the test voltage vector and the associated vector mean value or drive voltage vector are varied and delivered as an output. This enhances the potential dynamics of the drive voltage vector, given that, in this case, a new drive voltage vector can be set in each step.

According to one embodiment, in step a), the sum vector output is delivered during one half-pulse or one pulse of pulse-width modulation and the resulting variation in the current vector is measured, wherein step a), with a changed rotational angle position and/or a changed value for the drive voltage vector, and with a changed test voltage vector, is repeated a number n of times in the subsequent half-pulses or pulses of pulse-width modulation such that, in n+1 sequential half-pulses or pulses, n+1 different test voltage vectors and sum vectors are generated, and the resulting variations in the current vector are measured. With respect to the generation of voltage vectors in PWM cycles or PWM half-cycles, or the corresponding PWM pulses or PWM half-pulses, reference may be made to the relevant specialized literature, particularly with regard to "double-flank modulation".

According to one embodiment, step a) is repeated three times, i.e. n=3.

According to one embodiment, a first test voltage vector is anti-parallel to a second test vector, and a third test voltage vector is anti-parallel to a fourth test vector, wherein the first test voltage vector and the second test voltage vector are perpendicular to the third test vector and the fourth test voltage vector.

For each repetition of step a), the test voltage vectors can be (further) rotated through a constant angle within the determination time interval, for example through 60° or 90°.

According to one embodiment, all the test voltage vectors are of an identical value.

According to one embodiment, estimation of the rotational angle position is further executed in accordance with the n+1 test voltage vectors and/or in accordance with the drive voltage vector, in its various rotational angle positions and/or values.

According to one embodiment, the drive voltage vector, in a subsequent step within the determination time interval, is varied exclusively in the direction of the test voltage vector employed in the temporally preceding step.

According to one embodiment, the value and phase of the current vector are regulated by means of a current control loop comprising a current controller, wherein the drive voltage vector is employed as a control variable of the current controller, wherein an actual current vector of the current control loop is formed from the phase currents and a correction value, and wherein the correction value represents a variation in the current vector which is generated by a respective test voltage vector.

The frequency converter according to the invention is particularly configured to execute the above-mentioned method.

The function of the frequency converter is the actuation of a multi-phase, particularly a three-phase electrical machine.

The frequency converter comprises an inverter, which is configured to generate phase voltages for the multi-phase electrical machine by means of pulse-width modulation. The inverter can comprise, for example, a conventional H6 bridge.

The frequency converter further comprises a current sensor unit, for example having two current sensors, which is configured to measure the phase currents generated by means of the inverter. In a three-phase system, two current sensors can be sufficient, as the third phase current can be computationally determined from the two other phase currents.

The frequency converter further comprises a torque regulator for the control of a torque generated by means of the electrical machine, wherein the torque regulator delivers a target current vector as a control variable output.

The frequency converter further comprises a current controller, which is configured to adjust the value and phase of an actual current vector formed from the measured phase currents, optionally corrected by the application of a correction value, to the target current vector, wherein the current controller employs a drive voltage vector as a control variable.

The frequency converter further comprises a test voltage vector generation unit, which is configured to generate temporally sequential test voltage vectors.

The frequency converter further comprises a vector addition unit, which is configured for the vectorial addition of an instantaneous drive voltage vector and a corresponding test voltage vector to form a sum vector.

The frequency converter further comprises a conventional PWM unit which is configured to generate actuation signals for the inverter on the basis of the sum vector. In this regard, reference may be made to the relevant specialized literature.

The frequency converter further comprises a rotational angle estimation unit, which is configured to estimate a rotational angle position of the rotor, in accordance with a variation in the current vector which is generated by the test voltage vectors.

The invention is fundamentally based upon anisotropy-based methods, wherein injection patterns are employed which are imposed upon a specific voltage pattern in order to determine rotational angle position-dependent impedances of the electrical machine.

According to the method employed in WO 2017/045810 A1, during a determination time interval or injection interval which is comprised of at least four sequential test voltage vectors, the vector Ufoc, which corresponds to the drive voltage vector according to the invention, is maintained constant, i.e. the four quadratically-injected and unaveraged test voltage vectors are oriented in a perpendicular or anti-parallel arrangement to one another. This restricts dynamics, as the vector Ufoc can only be varied by one quarter of the PWM switching frequency.

According to the invention, four test voltage vectors or injections can likewise be employed per determination time interval. However, a variation of the drive voltage vector or fundamental vector is permitted in each injection step. This variation can generate a potential error in positional determination. For this reason, within a determination time interval, the maximum angle can be defined through which it is permissible for the fundamental vector or drive voltage indicator to be further moved. After the completion of a respective determination time interval or injection interval, an arbitrary new fundamental vector or drive voltage vector can be set. Thus, advantageously, a high dynamic response to small variations is possible within an injection interval.

According to a further option for the combination of high dynamics and the employment of an optimum injection pattern, further rotation of the drive voltage vector during injection is permitted, and the resulting error is then considered and factored out of the angular evaluation.

According to a further option, a variation of the drive voltage vector is permitted, but only in the instantaneous direction of injection, i.e. in the α-direction, if injection is executed in the +/−α-direction, and in the β-direction, if injection is executed in the +/−β-direction. The current variation is then scaled, for example, in accordance with the ratio between the injection voltage and the variation in the fundamental voltage or drive voltage.

In principle, the injection of test voltage vectors causes a current variation or a variation in the current vector. If only one current controller is present, which is configured for the regulation of current or the current vector, this current controller can counteract voltage injection in an unwanted manner. Where inductances and injection voltages are known, for example on the basis of a voltage measurement, a current rise associated with the test voltage vectors can be estimated, and the actual current value fed to the controller can be correspondingly corrected, such that the current variation associated with the injection of test voltage vectors is offset up-circuit of the current controller.

In a stationary state, assuming the compensation of EMF, the following approximation applies for a current variation in an injection interval:

$$Y \cdot \Delta u \approx \frac{di}{Dt}$$

Where Y is the impedance matrix and u is the vector of test voltages or injection voltages in the associated coordinate system (for example, a α/β coordinate system). The current rise in one step or pulse of the determination time interval can thus be substantially factored out.

A further option involves the employment of different values for test voltage vectors, as a means of further rotating the drive voltage vector or fundamental vector in the desired direction. Injection in one direction is multiplied by the factor x. For the evaluation of current rises in this interval, current rise values are divided by the factor x, in order to compensate the different voltages.

The method envisaged is based upon the determination of impedances in the direction of the α- or β-axis. Although it is possible to employ quadratic injection for this purpose, this determination is possible by means of three test voltage vectors or voltage space vectors. Unlike the above-mentioned method, however, a condition applies to the effect that the voltage of the drive voltage vector or the fundamental vector should not change. For example, a compensation vector is applied in the third pulse, which negates current rises in the first two injection cycles. For example, a first pulse is injected in the positive β-axis, followed by a second pulse in the negative a-axis. Finally, during the third pulse, the compensation vector formed from the vectorial addition of the two preceding vectors is applied. This injection pattern permits the determination of impedance by means of simple computational methods, and requires only three injection cycles, after which the fundamental voltage can be varied once more.

The invention is described in detail hereinafter, with reference to the drawings.

DETAILED DESCRIPTION OF THE DRAWINGS

Figure 1:
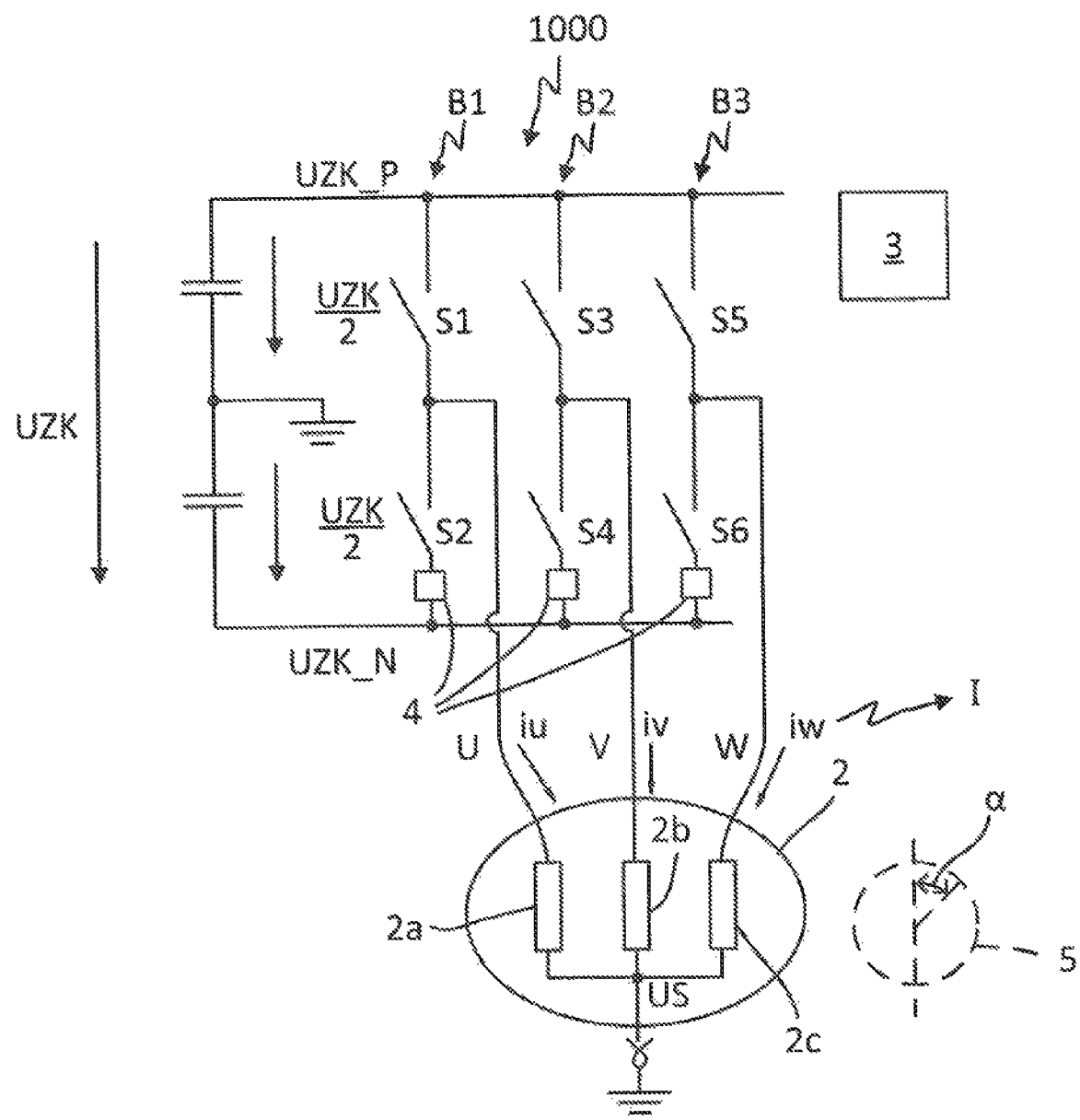
FIG. 1 is a highly schematic representation of a frequency converter which is configured for the execution of the method according to an embodiment of the invention.

FIG. 1 shows a frequency converter 1000, which is configured for the actuation of a three-phase electrical machine 2 in the form of a synchronous motor having a rotor 5, wherein the frequency converter 1000 conventionally comprises three half-bridges B1, B2, B3, each having two semiconductor switching elements S1, S2; S3, S4; S5, S6. The switching elements S1, S2; S3, S4; S5, S6 are actuated by a control unit 3 of the frequency converter 1000.

Figure 2:
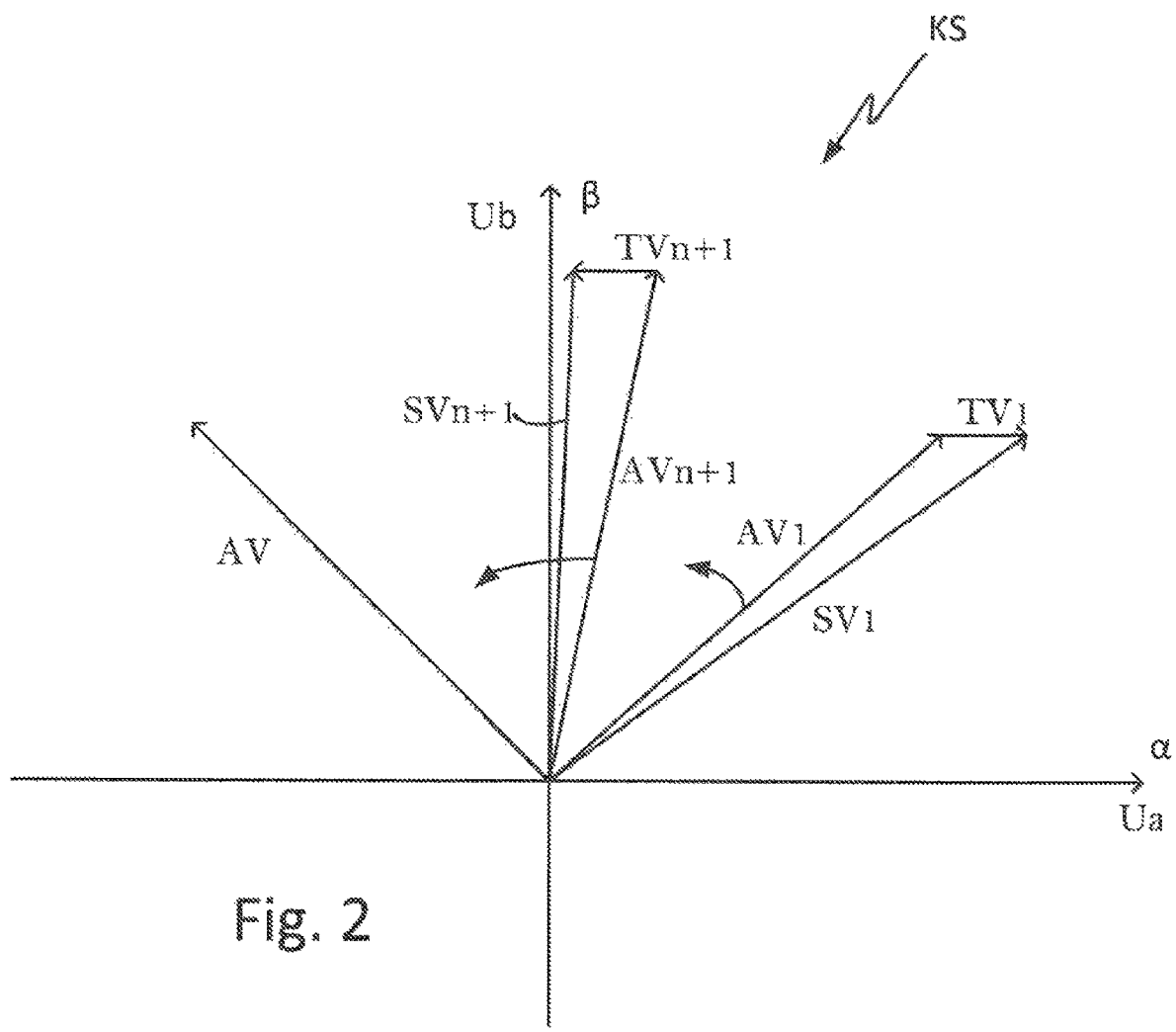
FIG. 2 shows exemplary drive voltage vectors and test voltage vectors in a stator-fixed α/β coordinate system.

With reference to FIG. 1 and FIG. 2, three phase voltages U, V, W for the three phase windings 2a, 2b and 2c of the three-phase electrical machine 2 are generated by means of pulse-width modulation, in accordance with a drive voltage vector AV circulating in a stator-fixed $\alpha/\beta$ coordinate system KS, which initiate a rotation of the rotor 5.

Figure 5:
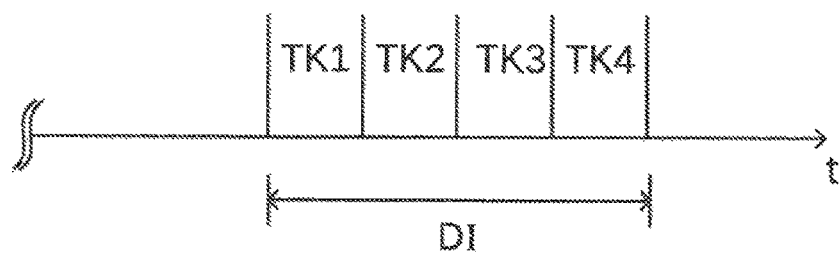
FIG. 5 shows an exemplary half-pulse of pulse-width modulation.

For the estimation of the rotational angle position $\alpha$ (see FIG. 1) of the rotor 5, the following steps are executed during a determination time interval DI (see FIG. 5).

Figure 3:
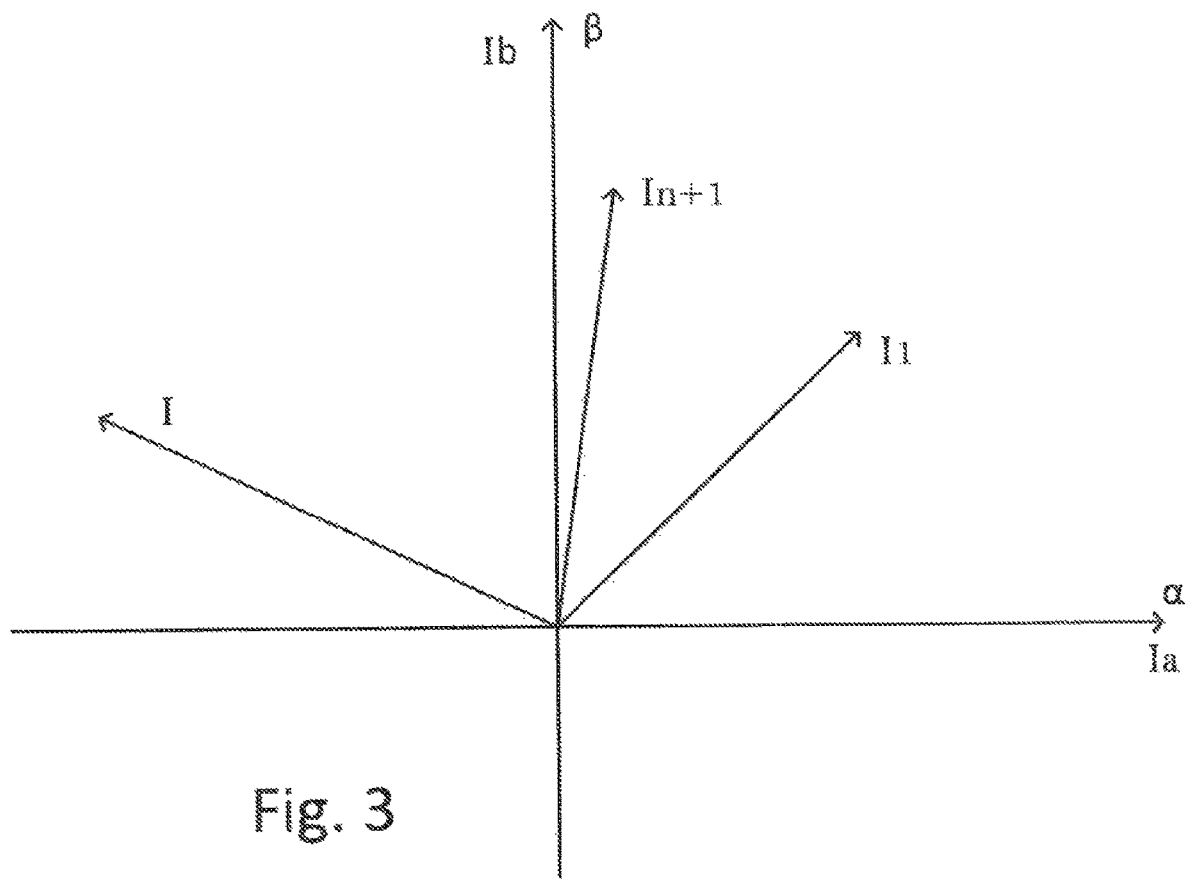
FIG. 3 shows exemplary current vectors in the stator fixed α/β coordinate system.

Firstly, a test voltage vector TV1 is generated, and the test voltage vector TV1 and an instantaneous drive voltage vector AV1 are vectorially added thereafter to form a sum vector SV1. The sum vector SV1 is delivered as an output by the appropriate positional setting of the half-bridges B1, B2, B3, and by means of appropriate PWM actuation. Finally, a resulting variation in a current vector I1 formed from the phase currents iu, iv, iw is measured—see FIG. 3.

These steps are repeated n=3 times with a changed rotational angle position and a changed value of the drive voltage vector AV, and with a changed test voltage vector TV, such that a total of four different test voltage vectors TV1 to TVn+1 or TV4 and sum vectors SV1 to SVn+1 to SV4 are generated, and n+1 or four resulting variations in the current vector I1 to In+1 or I4 are measured.

Finally, the rotational angle position $\alpha$ of the rotor 5 is estimated in accordance with the total of four measured variations in the current vector I1 to I4, the four test voltage vectors TV1 to TV4, and in accordance with the drive voltage vector AV1 to AV4, in its different rotational angle positions and/or values.

Figure 4:
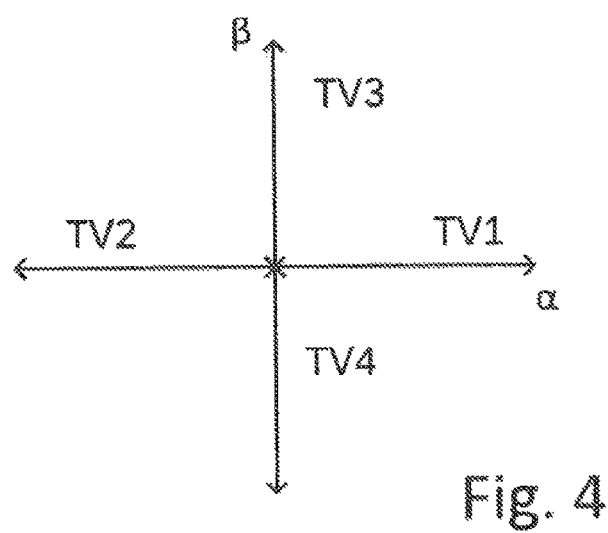
FIG. 4 shows four exemplary test voltage vectors in the stator-fixed α/β coordinate system, which are employed during a determination time interval for the estimation of a rotational angle position of a rotor of a synchronous machine.

With reference to FIG. 4, the first test voltage vector TV1 is antiparallel to the second test vector TV2, the third test voltage vector TV3 is antiparallel to the fourth test voltage TV4, wherein the first test voltage vector TV1 and the second test voltage vector TV2 are perpendicular to the third test vector TV3 and the fourth test voltage vector TV4. All the test voltage vectors TV1 to TV4 assume an identical value, and are comprised exclusively of components in the $+-\alpha$-direction or the $+-\beta$-direction.

With reference to FIG. 5, the determination time interval DI extends over a total of four half-pulses TK1 to TK4 or half-cycles of pulse-width modulation, and consequently assumes a duration which corresponds to two pulse-width modulation cycles.

Figure 6:
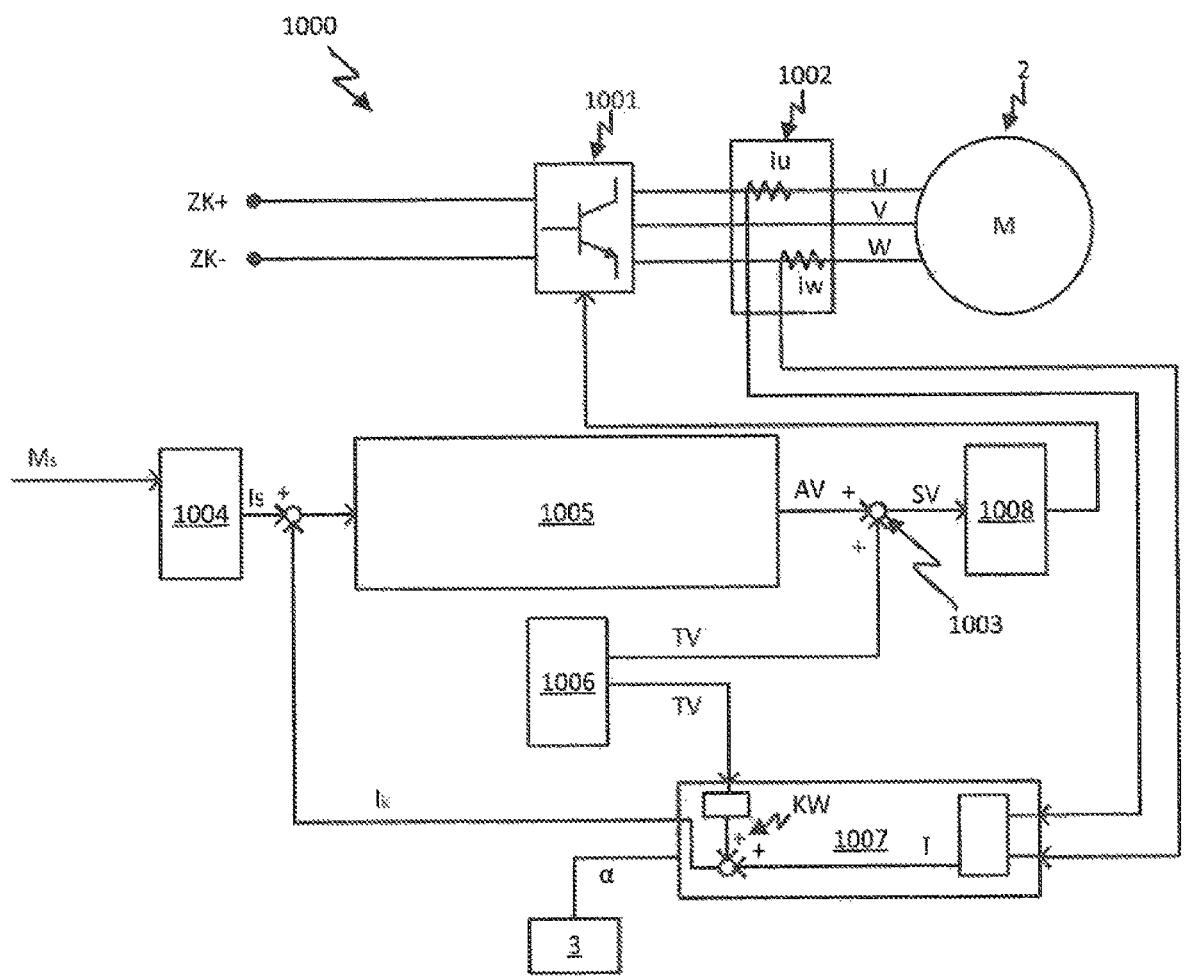
FIG. 6 is a schematic block circuit diagram of a control structure of the frequency converter represented in FIG. 1.

FIG. 6 is a schematic representation of a block circuit diagram of a control structure of the frequency converter 1000.

The frequency converter 1000 comprises an inverter 1001, which can be configured as represented in FIG. 1, and is configured to generate phase voltages U, V, W for the three-phase electrical machine 2 by means of pulse-width modulation.

The frequency converter 1000 further comprises a current sensor unit 1002, which is configured for the measurement of phase currents iu, iv, iw produced by means of the inverter. In the present case, only the currents iu and iw are determined by means of appropriate current sensors, wherein the current iv is determined computationally.

The frequency converter 1000 further comprises a torque regulator 1004 for controlling a torque which is generated by means of the electrical machine 2, wherein the torque regulator 1004 delivers a target current vector IS as a control variable output.

The frequency converter 1000 further comprises a current controller 1005, which is configured to adjust the value and phase of the current vector I or Ik formed from the measured phase currents iu, iv, iw to the target current vector IS, wherein the drive voltage vector AV is employed as a control variable of the current controller 1005.

The frequency converter 1000 further comprises a test voltage vector generation unit 1006, which is configured to generate the temporally sequential test voltage vectors TV1 to TV4.

The frequency converter 1000 further comprises a vector addition unit 1003, which is configured for the vectorial addition of the instantaneous drive voltage vector AV and a corresponding test voltage vector TV to form a sum vector SV.

The frequency converter 1000 further comprises a PWM unit 1008, which is configured to generate actuation signals for the inverter 1001 on the basis of the sum vector SV.

The frequency converter 1000 further comprises a rotational angle estimation unit 1007, which is configured to estimate a rotational angle position $\alpha$ of the rotor 5, in accordance with a variation in the current vector I which is generated by the test voltage vectors TV.

The value and phase of the current vector I are regulated by means of the current control loop, having the current controller 1005. A corrected current vector Ik of the current control loop, delivered as an output from the rotational angle estimation unit 1007, is formed in the rotational angle estimation unit 1007 from the phase currents iu, iv, iw and a correction value KW, wherein the correction value KW represents a variation in the current vector I associated with a respective test voltage vector TV1 to TV4. This prevents any corruption of the output of the test voltage vectors TV1 by the current controller 1005.

The invention claimed is:

1. A method for determining a rotational angle position of a rotor of a multi-phase electrical machine, the method comprising the steps of:
   generating phase voltages for the multi-phase electrical machine by way of pulse-width modulation, in accordance with a drive voltage vector circulating in a stator-fixed coordinate system; and
   executing, during a determination time interval, the steps of:
   a) generating a test voltage vector;
      vectorially adding the test voltage vector and an instantaneous drive voltage vector to form a sum vector, and
      outputting the sum vector and measuring a resulting variation in a current vector formed from the phase currents;
   b) repeating step a) a number n of times, with a changed rotational angle position and/or a changed value of the drive voltage vector, and with a changed test voltage vector, such that a total of n+1 different test voltage vectors and sum vectors are generated, and n+1 resulting changes of the current vector are measured; and
   c) estimating the rotational angle position of the rotor in accordance with the total of n+1 measured variations in the current vector.

2. The method according to claim 1, wherein
in step a), during one half-pulse or one pulse of pulse-width modulation, the sum vector output is delivered and the resulting variation in the current vector is measured, wherein step a), with a changed rotational angle position and/or a changed value for the drive voltage vector, and with a changed test voltage vector, is repeated a number n of times in the subsequent half-pulses or pulses of pulse-width modulation such that, in n+1 sequential half-pulses or pulses, n+1 different test voltage vectors and sum vectors are generated, and the n+1 resulting variations in the current vector are measured.

3. The method according to claim 1, wherein
step a) is repeated three times.

4. The method according to claim 3, wherein
a first test voltage vector is antiparallel to a second test voltage vector,
a third test voltage vector is antiparallel to a fourth test voltage vector,
wherein the first test voltage vector and the second test voltage vector are perpendicular to the third test voltage vector and the fourth test voltage vector.

5. The method according to claim 1, wherein
all the test voltage vectors assume an identical value.

6. The method according to claim 1, wherein
estimating the rotational angle position is further executed in accordance with the n+1 test voltage vectors and/or in accordance with the drive voltage vector in its different rotational angle positions and/or values.

7. The method according to claim 1, wherein
the drive voltage vector, in a subsequent step within the determination time interval, is varied exclusively in a direction of the test voltage vector precedingly employed.

8. The method according to claim 1, wherein
the value and phase of the current vector are regulated via a current control loop comprising a current controller, wherein
the drive voltage vector is employed as a control variable of the current controller,
the current vector is formed from the phase currents and a correction value, and
the correction value represents a variation in the current vector which is generated by a respective test voltage vector.

9. A frequency converter configured to execute a method according to claim 1.

10. A frequency converter for actuating a multi-phase electrical machine, the frequency converter comprising:
an inverter configured to generate phase voltages for the multi-phase electrical machine via pulse-width modulation;
a current sensor unit configured to measure phase currents generated by the inverter;
a torque regulator that controls a torque generated by the electrical machine, wherein the torque regulator delivers a target current vector as a control variable output;
a current controller configured to adjust a value and phase of a current vector obtained from the measured phase currents to the target current vector, wherein the drive voltage vector is employed as a control variable of the current controller;
a test voltage vector generation unit, which is configured to generate temporally sequential test voltage vectors;
a vector addition unit configured for vectorially adding an instantaneous drive voltage vector and a corresponding test voltage vector to form a sum vector;
a PWM unit configured to generate actuation signals for the inverter based on the sum vector, and
a rotational angle estimation unit configured to estimate a rotational angle position of the rotor, in accordance with a variation in the current vector which is generated by the test voltage vectors.

* * * * *